UNITED STATES PATENT OFFICE.

FRANCIS L. STEWART, OF MURRYSVILLE, PENNSYLVANIA.

IMPROVEMENT IN PROCESSES FOR CLARIFYING THE JUICES OF SORGHUM AND MAIZE.

Specification forming part of Letters Patent No. 203,507, dated May 7, 1878; application filed March 4, 1878.

*To all whom it may concern:*

Be it known that I, FRANCIS L. STEWART, of Murrysville, in the county of Westmoreland and State of Pennsylvania, have invented a new and useful Improvement in a Process for Clarifying the Juices of Sorghum and Maize, and for preparing them for crystallization, which improved process is fully set forth in the following specification.

This invention relates to a process for the clarification or defecation of sorghum and maize juices in order to prepare them for the ready and complete crystallization of the sugar which they contain; and it consists in a mode of treatment, which is, briefly, as follows, to wit: After the aforesaid juices have been defecated as fully as possible by the combined action of lime in excess and heat, and after the excess of lime has been entirely neutralized by sulphurous oxide, (dioxide of sulphur,) either combined with water, (sulphurous acid,) or in other convenient form mixed with the juice, and after all previously-formed scums and precipitates have been entirely removed, the clear liquid is then subjected to a second defecating process, which consists, in the first place, in reducing the temperature of the previously-heated juice to 140° Fahrenheit, and then in adding to it sulphurous oxide in any convenient form, in quantity sufficient to acidify it in a high degree, and in maintaining in the juice this strongly-acidulous condition by subsequent additions to it of sulphurous oxide until it has been reduced by rapid boiling in an open-air evaporating-pan to the condition of a dense sirup.

Heretofore, in clarifying and defecating saccharine juices by the use of a large excess of lime and heat, the method has been to mix enough of lime with the juice to form a lime compound with a large part or the whole of the sugar, and afterward to neutralize or remove the lime by carbonic acid, assisted by filtration through bone-black. This method is inefficient as applied to the above-mentioned juices, because there are very harmful impurities which still remain dissolved in the saccharine liquid after the lime has been removed by precipitation by carbonic acid and filtration through bone-black, or neutralized by any known chemical agent suitable for that purpose.

The object of my invention is to provide a means for completely defecating and preparing for the ready crystallization of the sugar the juices of sorghum and maize by the removal, during the final stages of the evaporation of the sirup, of certain substances, especially some containing nitrogen, which hinder crystallization and are injurious to the sugar, and which are not separable by any of the processes now in use.

In carrying out my invention, take freshly-slaked lime in the condition of a moist hydrate, or in the form of a saccharate of known strength. Heat the fresh juice to 180° Fahrenheit, and mix lime in either of the above-mentioned forms with it in quantity, estimated in the fresh unslaked condition, varying from from one to two per cent. of the fresh juice, more lime generally being necessary to be added to the juice of sorghum than to the juice of maize. Then heat the juice rapidly to the boiling-point, and remove the scum formed. Next mix with the juice sulphurous oxide, preferably in the form of a strong solution of it in water, (sulphurous acid,) in quantity somewhat more than sufficient to neutralize the lime in the juice, as indicated by its removing the color from litmus-paper made blue by having been dipped into the previously alkaline juice. When the juice thus treated has boiled for a few minutes, shut off the heat, and either allow it to remain at rest till the sediment has fallen, and then decant the clear liquid from the sediment, or separate it immediately by filtration through cloth or other suitable material, and pass the juice into a large shallow cooling-tank, or cool it otherwise artificially until its temperature has been reduced to 140° Fahrenheit. When this temperature is reached, again add sulphurous oxide or acid to the juice in sufficient quantity to make it strongly acidulous. In order to facilitate the removal of the precipitates then forming without checking the evaporation or lowering the heat by carrying them to the surface, add to the juice at this point, before heat is again applied to it, a small quantity of albumen—about one-half pound of fresh egg albumen to one hundred gallons of juice. The albumen must previously have been thoroughly beaten up with four or five times its bulk of water, and must be well mixed with the juice by stirring. Then pass the juice into a shallow open-air evaporating-vessel of large surface, made preferably of copper; boil rapidly, removing the scum as it forms, and add from time to time in the course of the evaporation enough of the sulphurous oxide to maintain until its close a highly-acidulous condition of the juice.

It will be found that all the substances the continued presence of which in the liquid would either have destroyed the sugar or impeded its crystallization will by this means either be entirely removed or rendered inert, and the subsequent crystallization of the sugar will be accomplished with ease.

In all previous processes, as far as I am aware, in which lime in excess has been used, no successful attempt has been made to remove the impurities still remaining dissolved in the saccharine liquid after the final precipitation and removal of the lime, and therefore they have been inefficient as applied to the juices of sorghum and maize.

I claim as my invention—

The final depurating process applied to maize and sorghum juice, additional to and directly following defecation by the action of lime and heat, and neutralization of the excess of lime by sulphurous oxide, and consisting, first, in the reduction of the temperature of the previously-heated juice to 140° Fahrenheit; second, the admixture with it of sulphurous oxide in quantity sufficient to make it strongly acidulous; third, the addition of albumen to the juice in sufficient quantity; fourth, the rapid heating of the juice to the boiling-point and the immediate removal of the scum; and, fifth, the subsequent addition at intervals to the sirup, boiling at the atmospheric pressure, of sulphurous oxide in sufficient quantity to preserve it in an acid condition to the close of the evaporation, substantially as and for the purposes specified.

FRANCIS L. STEWART.

Witnesses:
   D. P. COWL,
   DANIEL CLARKE.